US005760125A

United States Patent [19]

Ohtomo et al.

[11] Patent Number: 5,760,125
[45] Date of Patent: Jun. 2, 1998

[54] THERMOPLASTIC RESIN COMPOSITION

[75] Inventors: Takashi Ohtomo, Utsunomiya; Hiromi Ishida, Moka; Hidekazu Kabaya, Moka; Hiroshi Kubo, Moka, all of Japan

[73] Assignee: General Electric Company, Pittsfield, Mass.

[21] Appl. No.: 763,207

[22] Filed: Dec. 11, 1996

Related U.S. Application Data

[63] Continuation of Ser. No. 221,162, Mar. 31, 1994, abandoned.

[30] Foreign Application Priority Data

Mar. 31, 1993 [JP] Japan ................................ 5-094844

[51] Int. Cl.$^6$ ........................................................ C08L 77/00
[52] U.S. Cl. ........................ 524/508; 524/504; 524/505; 525/92 B; 525/133; 525/397; 525/66
[58] Field of Search ........................... 525/397, 92 B; 524/508, 504, 505

[56] References Cited

U.S. PATENT DOCUMENTS

| 4,760,115 | 7/1988 | Droescher et al. | 525/132 |
| 5,001,181 | 3/1991 | Takagi et al. | 524/401 |
| 5,091,473 | 2/1992 | Arashiro et al. | 525/92 |
| 5,159,008 | 10/1992 | Nishida et al. | 524/494 |
| 5,162,433 | 11/1992 | Nishio et al. | 525/66 |
| 5,296,533 | 3/1994 | Nagaoka et al. | 524/430 |
| 5,310,776 | 5/1994 | Takagi et al. | 524/474 |

FOREIGN PATENT DOCUMENTS

| A-0 244 090 | 3/1987 | European Pat. Off. . |
| A-0 375 177 | 11/1989 | European Pat. Off. . |
| A-0 501 175 | 9/1992 | European Pat. Off. . |

Primary Examiner—Ana Woodward

[57] ABSTRACT

A resin composition which has improved resistance to yellowing due to light without loss of the superior characteristics of polyphenylene ether polyamide resins comprises (A) a polyphenylene ether resin, (B) a polyamide resin, (C) a styrene thermoplastic resin, (D) a pigment;

wherein the styrene thermoplastic resin and the pigment are dispersed in the polyphenylene ether resin and the polyphenylene ether resin is a particulate dispersion in the polyamide resin. The composition may further comprise a rubber polymer wherein the rubber polymer is dispersed in the polyphenylene ether resin.

10 Claims, No Drawings

THERMOPLASTIC RESIN COMPOSITION

This is a continuation of of application Ser. No. 08/221, 162 filed on Mar. 31, 1994 now abandoned.

BACKGROUND OF THE INVENTION

The present invention concerns a resin composition that contains a polyamide resin (referred to below as "PA") and a polyphenylene ether resin (referred to below as "PPE"), and in additional detail, concerns a thermoplastic resin composition where yellowing due to light is suppressed.

Resin compositions composed of polyphenylene ether resins and polyamide resins have excellent heat resistance, molding properties, oil resistance and organic solvent resistance. Because resin compositions produced by adding an elastomer to such compositions have excellent impact resistance as well, these compositions can be used as automobile parts, electrical and electronic parts and machine parts, and in particular, because such materials can be painted on-line, they are especially advantageous for use as external parts for automobiles. For example, such compositions may be used as external parts such as foil covers, bumpers and spoilers, and external plate panels such as fenders.

However, because PPE, which is the primary component in PPE/PA resin compositions, has the characteristic of yellowing when exposed to light, it is necessary to paint the composition when it is to be used as an external part. In order to completely prevent this yellowing phenomenon, a paint film must be thickly and uniformly applied, but this is uneconomical and inefficient. In addition, it is not easy to achieve uniform application of the paint film, and there are cases where the paint film is thin in areas, so that partial yellowing readily occurs. In particular, an undesirable state of affairs occurs by yellowing due to oily, cover materials, etc.

The present invention offers a resin composition appropriate for use in external parts for automobiles which has suppressed yellowing due to light, while maintaining the superior characteristics of PPE/PA resins.

SUMMARY OF THE INVENTION

The present inventors, as a result of painstaking and repeated investigations towards the objectives described above, arrived at the present invention upon discovering that the objectives of the present invention are achieved by means of a PPA/PA resin composition where part of the PPE has been replaced with a styrene thermoplastic resin having good compatibility with PPE, and wherein a high blend amount of pigment has been added, where said resin composition is produced by melt-kneading 0–5 wt % PA with respect to the total amount of PPE, styrene thermoplastic resin, pigment, and rubber polymer as necessary, and then blending and kneading the rest of the PA, thus forming a particulate dispersion of PPE in the PA phase that constitutes the continuous phase, and in addition, where the styrene thermoplastic resin, the rubber polymer and the pigment are dispersed in said PPE phase.

DESCRIPTION OF THE PREFERRED EMBODIMENT(S)

Specifically, the present invention is a thermoplastic resin composition pertaining to a thermoplastic resin composition that contains D) 0–50 parts by weight rubber polymer with respect to 100 parts by weight comprising A) 10–35 wt % of a polyphenylene ether resin,
B) 36–65 wt % of a polyamide resin and
C) 5–29 wt % of a styrene thermoplastic resin, and
E) 2–20 parts by weight of a pigment with respect to 100 parts by weight of the total of (A)–(D), where said resin composition constitutes a particulate dispersion of (A) in (B), with (C), (D) and (E) being essentially dispersed in (A).

First, in the resin composition of the present invention, it is necessary that a condition be achieved whereby the PPE phase is dispersed as a particulate in the PA phase which is the continuous phase, and in addition, whereby the styrene thermoplastic resin, rubber polymer and pigment are in a dispersed condition (morphology) in the PPE phase. By means of such a morphology, a resin is obtained which has improved resistance to light yellowing while maintaining the superior characteristics of PPE/PA resins (particularly, heat resistance and impact resistance).

The aforementioned morphology can be achieved by the following method. Specifically, 0–5 wt % of a component (B) PA is melt-kneaded in the total amounts of each of the component (A) PPE, component (C) styrene thermoplastic resin, component (D) rubber polymer as necessary, and component (E) pigment, whereupon the rest of component (B) is melt-kneaded. It is difficult to achieve the aforementioned type of morphology without using said manufacture method. For example, when components (A)–(E) alone are simply melt-kneaded in a single mass, the PPE will not be completely dispersed in the PA in spite of the fact that the styrene thermoplastic resin enters into the PPE phase, and thus there will be a strong decrease in impact resistance. In addition, the layer separation (delamination) characteristics will be inferior and the thermal deformation temperature will decrease. In order to stably obtain the morphology wherein the PPE phase is microdispersed in the PA phase, first, the component (A) is melt-kneaded beforehand with component (C) and component (D), and components (C) and (D) are well-dispersed in component (A). It is preferable for 0.01–10 parts by weight of at least one compound selected from among the following to be added per 100 parts by weight of the total of components (A) and (B): compatabilizers for components (A) and (B), for example, component (F) a) citric acid, malic acid, agaricic acid and derivatives thereof, and b) a compound containing i) carbon—carbon double bonding or triple bonding, ii) carboxylic acid groups, acid anhydride groups, acid amide groups, imide groups, carboxylic acid ester groups, epoxy groups, amino groups, hydroxy groups or oxazolinyl groups in each molecule. The aforementioned morphology can thus be readily obtained.

On the other hand, if components (A), (C) and (D) are melt-kneaded beforehand following the method of the present invention and the latter components (B) and (E) are then added, the resulting stable morphology is obtained, but because the pigment is dispersed in the PA phase which is primarily the continuous phase, the impact resistance and elongation are inferior.

The temperature and time for melt-kneading are different depending on the type of PA and the component ratio of the PPE/PA resins that are used, but a temperature of 240°–350° C. and a time of 0.2–10 min are preferred, with 0.5–5 min being particularly desirable.

Examples of the melt-kneading device include extruders, kneaders, Banbury mixers, etc., with extruders being preferred and biaxial screw extruders being particularly desirable. For example in a biaxial extruder whereby supply of the raw material is possible from the upstream region or downstream region or both, components (A), (C), (D), (E) and (F) may be supplied upstream and component (B) may be supplied down-stream, and thus the composition of the present invention can be obtained in a single extrusion procedure.

Well-known substances may be used for the polyphenylene ether resin (PPE) component (A) used in the present invention. Examples of polyphenylene ether resins include the polymers indicated by Formula 1.

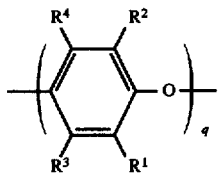

Formula I

In the formula I, $R^1$, $R^2$, $R^3$ and $R^4$ each individually denote univalent substitute groups such as hydrogen atoms, halogen atoms, alkyl groups, alkoxy groups and haloalkyl groups having at least 2 carbon atoms between the phenyl ring and halogen atom, or haloalkoxy groups that contain no tertiary α-carbons, and q denotes an integer expressing the polymerization number. The aforementioned polymer indicated by the general formula may be composed of individual polymers or copolymers composed of a mixture of two or more types.

There are no particular limitations on the method for manufacturing the PPE, and, for example, manufacture may be carried out by a phenol reaction following the procedure described in U.S. Pat. Nos. 3,306,874, 3,257,357 and 3,257,358. Examples of these phenols include 2,6-dimethylphenol, 2,6-diethylphenol, 2,6-dibutylphenol, 2,6-dilaurylphenol, 2,6-dipropylphenol, 2,6-diphenylphenol, 2-methyl-6-ethylphenol, 2-methyl-6-cyclohexylphenol, 2-methyl-6-tolylphenol, 2-methyl-6-methoxyphenol, 2-methyl-6-butylphenol, 2,6-dimethoxyphenol, 2,3,6-trimethylphenol, 2,3,5,6-tetramethylphenol and 2,6-diethoxyphenol, but examples are not limited to these. A homopolymer formed by a reaction between individual types of these substances may be used, and copolymers having different units expressed by the aforementioned formula formed by the reaction of two or more types may also be used.

Desirable specific examples are those wherein $R^1$ and $R^2$ are alkyl groups with carbon numbers of 1–4, and alkyl groups wherein $R^3$ and $R^4$ are hydrogen atoms or alkyl groups with carbon numbers of 1–4, for example, poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether and poly(2-ethyl-6-propyl-1,4-phenylene)ether. In addition, examples of PPE copolymers include those which have alkyl tri-substituted phenols in the aforementioned polyphenylene ether repeating units, for example, copolymers partially containing 2,3,6-trimethylphenols.

In the present invention, a PPE produced by a modification wherein the terminals of the PPE are modified with groups that can react with amino groups, for example, epoxy groups, carboxyl groups and acid anhydrides, can be used instead of part or all of the aforementioned PPE. By this means, the aforementioned morphology of the present invention can be easily obtained without adding component (F). The formation of epoxy groups, carboxyl groups or acid anhydride groups on the terminals of the PPE molecule can be carried out by a well-known method.

The formation of the terminal epoxy groups is described, for example, in Japanese Kokai Patent Application No. 63[1988]-125525. The PPE having terminal epoxy groups can be obtained by bringing PPE into contact with a substance having epoxy groups while heating. Desirable examples of compounds having epoxy groups are those having epoxy groups on both ends or epoxy compounds wherein one of the terminal groups is a halogen group. Desirable examples of compounds having epoxy groups on one end include epichlorohydrin and 2-methylepichlorohydrin, and desirable examples of compounds having epoxy groups on both ends include 2,2-bis (4-glycidyl phenyl ether)propane and epoxy resins. Compounds having epoxy groups on one end are particularly desirable from the standpoint of limiting blocking of the PPEs.

Methods for forming terminal carboxy groups and acid anhydride groups are described, for example, in Japanese Tokuhyo Patent No. Sho 62[1987]-500456, and the PPE that contains terminal carboxy groups or acid anhydrides can be obtained by allowing PPE to react with an acid chloride having carboxy groups or acid anhydride groups, for example, a trimellitic anhydride chloride.

The aforementioned terminal-modified PPE need not be a substance wherein all of the terminals of the PPE molecules are modified. The modified terminal groups are preferably contained in the amount of, for example, 70 wt % or less with respect to the total amount of the PPE component (A).

It is preferable to use the terminal-modified PPE obtained in the manner described above because the aforementioned morphology of the present invention can thus be easily obtained.

The component (B) polyamide (PA) used in the present invention has —CONH— bonding in the primary chain of the polymer, and can be melted by heating. Typical examples thereof include nylon 4, nylon 6, nylon 12, nylon 66, nylon 46, nylon 610, nylon 612 and nylon 6T (polyamide composed of terephthalic acid and hexamethylenediamine), nylon MXD6 (polyamide composed of adipic acid and m-xylylenediamine), mixtures of nylon 6 and nylon 66, hexamethylenediamine, adipic acid and caprolactam copolymers, etc. Of these substances, aliphatic polyamide polymers are preferable, and nylon 66 and nylon 6 are additionally desirable. All of these substances are commercially available.

Examples of the component (C) styrene thermoplastic resin used in the present invention include polystyrenes, rubber-modified polystyrenes (HIPS resin), styrene acrylonitrile copolymers, styrene rubber substance copolymers and acrylonitrile copolymers (ABS resins, AES resins, AAS resins and ACS resins). Two or more types of these substances may be used. In addition, part of these styrenes, and/or part or all of the acrylonitrile may be substituted with a vinyl monomer that is copolymerizable with styrene, such as α-methylstyrene, p-methylstyrene, p-t-butylstyrene, methyl (meth)acrylate, ethyl (meth)acrylate, or propyl (meth)acrylate, n-butyl and other ester compounds, maleimides, N-methylmaleimides, N-cyclohexylmaleimides, N-phenylmaleimides and other maleimide monomers. Polystyrene, HIPS resins, ABS resins, AES resins, AAS resins, ACS resins, MBS resins, etc., are preferably used, with polystyrene and HIPS resins being particularly desirable.

There are no limitations on the method for manufacturing the styrene thermoplastic resin, and an ordinary method may be used such as bulk polymerization, suspension polymerization, emulsion polymerization or bulk-suspension polymerization.

The resin composition of the present invention preferably contains a component (D) rubber polymer in order to further improve the impact resistance. Examples of said component (D) rubber polymer include natural and synthetic polymer substances which are elastic at room temperature. Specific examples thereof include natural rubber, butadiene polymers, styrene/isoprene copolymers, butadiene/styrene copolymers (random copolymers, block copolymers, graft copolymers and others), isoprene polymers, chlorobutadiene polymers, butadiene/acrylonitrile copolymers, isobutylene polymers, isobutylene/butadiene copolymers, isobutylene/isoprene copolymers, acrylic acid ester polymers, ethylene/propylene copolymers, ethylene/propylene/diene copolymers, Thiokol rubber, polysulfide rubber, polyurethane rubber, polyether rubber (for example, polypropylene oxide) and epichlorohydrin rubber.

These rubber polymers may be formed by any polymerization method (for example, emulsion polymerization or solution polymerization) and using any catalyst (for example, peroxides, trialkylaluminum, lithium halides and nickel catalysts). In addition, substances having microstructures of various proportions (for example, cis structures, trans structures and vinyl groups) or substances having uniform rubber particle diameters of various types may be used. Moreover, any various copolymer such as random copolymers, block copolymers and graft copolymers may be used. Furthermore, in manufacturing the rubber polymer, the components may be copolymerized with other monomers such as olefins, dienes, aromatic vinyl compounds, acrylic acids, acrylic acid esters and methacrylic acid esters. Any means may be used for the copolymerization method, such as random copolymerization, block copolymerization and graft copolymerization. Examples of these monomers include ethylene, propylene, styrene, chlorostyrene, α-methylstyrene, butadiene, isobutylene, chlorobutadiene, butene, methyl acrylate, acrylic acid, ethyl acrylate, butyl acrylate, methyl methacrylate and acrylonitrile. In addition, partially modified rubber polymers may also be used, examples of which include hydroxy- or carboxy-terminated polybutadienes, partially hydrogenated styrene/butadiene block copolymers and partially hydrogenated styrene/isoprene block copolymers. Of these, hydrogenated SIS (SEPS) and hydrogenated SBS (SEBS) saturated rubber polymers are particularly desirable.

There are no particular restrictions on the component (E) pigment used in the present invention, and although various well-known organic pigments (phthalocyanine, quinacdolin [transliteration: possibly "quinacridone"], benzine [sic], etc.) and inorganic pigments (various metal oxides, sulfites and sulfates) may be used individually or in numerous combinations, inorganic pigments are preferable from the standpoint of heat resistance, weather resistance, solvent resistance and chemical resistance. For example, white pigments such as titanium oxide, zinc bloom and zinc sulfide, or blue systems such as cobalt blue, and black systems such as carbon black and iron black may be cited as examples. Of these, carbon black and titanium oxide pigments are appropriate for use due to their excellent effects in suppressing deterioration due to ultraviolet light, their concealing power and their chemical stability.

In order to promote the compatibility of the PPE and the polyamide resin, it is preferable to add a compatibilizer for both substances to the resin composition of the present invention. Said compatibilizer (F) is a substance well known for use with PPE and PA, and examples include a) citric acid, malic acid, agaricic acid and derivatives thereof, and b) at least one compound selected from those containing i) carbon—carbon double bonds or triple bonds, or ii) a carboxylic acid groups, acid anhydride groups, acid amide groups, imide groups, carboxylic acid ester groups, epoxy groups, amino groups, hydroxy groups or oxazolinyl groups in a single molecule.

The aforementioned substances (a) citric acid, malic acid, agaricic acid and derivatives thereof are described in Japanese Patent Application No. Sho 61[1987]-502195, and although the compounds expressed by General Formula 1 in said publication are mentioned in the present invention, the aforementioned substances are particularly desirable. Examples of derivatives include ester compounds, amide compounds, anhydrides, hydrates and salts. Examples of acid ester compounds include mono- or distearyl esters and acetyl esters of citric acid. Examples of acid amide compounds include N,N'-diethylamides, N,N'-di-propylamides, N-phenylamides, N-dodecylamides, N,N'-didodecylamides of citric acid or N-dodecylamides of malic acid. Examples of salts include calcium malate, calcium citrate, calcium malate [sic] and potassium citrate.

The compounds indicated by (b) above are described in Japanese Kokai Patent Application No. Sho 56[1981]-49753, and specific examples include maleic anhydride, maleic acid, fumaric acid, maleimide, maleic acid hydrazide and reaction products obtained from a diamine and a maleic anhydride:

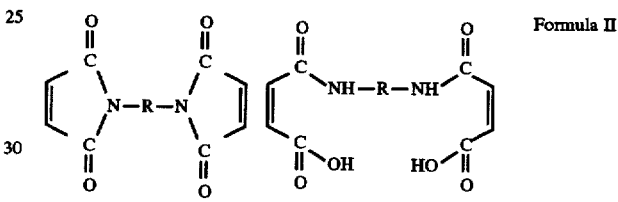

Formula II wherein R denotes an aliphatic or aromatic group. Nadic Methyl Anhydride, dichloromaleic anhydride, maleic acid amide, soybean oil, tung oil, castor oil, hempseed oil, cottonseed oil, sesame oil, rapeseed oil, peanut oil, camellia oil, olive oil, coconut oil, sardine oil, and other natural oils, epoxy-modified soy oil and other epoxy modified natural oils, acrylic acid, butenic acid, crotonic acid, vinyl acetic acid, methacrylic acid, pentenic acid, angelic acid, tiglic acid, 2-pentenic acid, 3-pentenic acid, α-ethylacrylic acid, β-methylcrotonic acid, 4-pentenic acid, 2-hexenic acid, 2-methyl-2-pentenic acid, 3-methyl-2-pentenic acid, α-ethylerotonic acid, 2,2-dimethyl-3-butenic acid, 2-heptenic acid, 2-octenic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosanoic acid, docosenoic acid, erucic acid, tetracosenoic acid, mycolipenic [transliteration] acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosaheptaenoic acid, erucic acid, docosadienic acid, docosatrienic acid, docosatetraenic acid, docosapentaenoic acid, tetracosenoic acid, hexacosenoic acid, hexacodienoic acid, octacosenoic acid, toraacontenic [transliteration: possibly, triacontanoic] acid and other unsaturated carboxylic acids or unsaturated carboxylic acid esters, acid amides, anhydrides or allyl alcohol, crotyl alcohol, methylvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, alcohols expressed by the general formulas $C_nH_{2n-5}OH$, $C_nH_{2n-7}OH$ and $C_nH_{2n-9}OH$ (where n denotes a positive integer), 3-butene-1,2-diol, 2,5-dimethyl-3-hexene-2,5-diol, 1,5-hexadiene-3,4-diol, 2,6-octadiene-4,5-diol and other unsaturated alcohols, or unsaturated amines wherein the OH groups of these unsaturated alcohols are substituted with —NH₂ groups, or butadiene, isoprene and other low polymers (substances with average molecular weights of, for example, 500–10000) or high polymers (for example, substances with average molecular weights of 10000 or greater) with adducts of maleic anhydrides or phenols, or substances wherein amino groups, carboxylic acid groups, hydroxy groups, epoxy groups, etc., have been introduced. Substances are also included in compound (b) which contain two or more functional groups selected from those listed in (i) or two or more functional groups selected from those listed in (ii) (the same or different types of groups).

Additional examples of the compatiblizer of component (B) include polymers and/or unsaturated monomers containing epoxy groups and/or oxazolinyl groups.

The following substances are examples of the unsaturated monomers having epoxy groups or oxazolinyl groups.

First, examples of desirable unsaturated monomers containing epoxy groups include glycidyl methacrylate (referred to below as "GMA"), glycidyl acrylate, vinyl glycidyl ether, hydroxyalkyl(meth)acrylate glycidyl ethers, polyalkylene glycol (meth)acrylate glycidyl ethers and glycidyl itaconate.

Examples of desirable oxazolinyl group containing unsaturated monomers include substances expressed by the general formula:

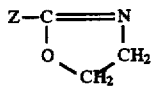

Formula III wherein Z contains polymerizable double bonds. Preferable substituent groups Z are given below;

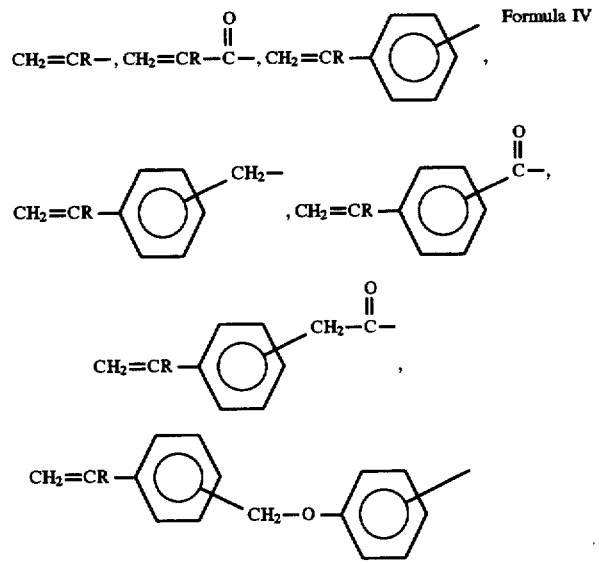

Formula IV wherein R in these formulas denotes a hydrogen atom or an alkyl group having 1–6 carbon atoms, or an alkoxy group, for example, a methyl group, i- or n-propyl group, or butyl group.

Particularly desirable compounds are the vinyloxazolines expressed by the general formula:

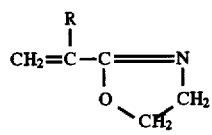

Formula V wherein R has the same meaning as above, and is preferably a hydrogen atom or methyl group.

Examples of polymers having epoxy groups or oxazolinyl groups include the homopolymers of the aforementioned unsaturated monomers, copolymers formed from two or more of the aforementioned unsaturated monomers, and copolymers formed from one or more of the aforementioned unsaturated monomers and other unsaturated monomers. Examples of other unsaturated monomers include styrene (referred to below as "St") and other aromatic vinyl monomers, acrylonitrile and other cyanide vinyl monomers, vinyl acetate, acrylic acid (salts), methacrylic acid (salts), acrylic acid esters, methacrylic acid esters, (anhydrous) maleic acid, maleic acid esters, 2-norbornene-5,6-dicarboxylic acid (anhydride) and other unsaturated carboxylic acids or derivatives thereof, ethylene, propylene, 1-butene, 1-pentene, 4-methyl-1-pentene, 1-hexene, 1-octene, 1-decene, 1-tetradecene, 1-hexadecene, 1-octadecene, 1-eicosene and other α-olefins, butadiene, isoprene, 1,4-hexadiene, 5-ethylidene-2-norbornene, 5-vinyl-2-norbornene and other diene components.

Examples of the copolymers include GMA/St, GMA/St/MMA (methyl methacrylate)/MA, GMA/St/acrylonitrile, GMA/MMA/acrylonitrile, GMA/MMA, GMA/MMA/St, vinyloxazoline/St, vinyloxazoline/MMA, ethylene/GMA, ethylene/vinyl acetate/GMA copolymers, etc. Copolymers other than those indicated above, of course, may be used in the present invention.

The aforementioned types of compatibilizers may be used individually or in combinations of two or more.

The blend proportions of component (A) PPE, component (B) PA and component (C) styrene thermoplastic resin in the resin composition of the present invention are: 10–35 wt % of component (A) with respect to the total amount of components (A), (B) and (C), with 15–30 wt % being preferred; 36–65 wt % of component (B), with 40–60 wt % being preferred; and 5–29 wt % of component (C), with 10–20 wt % being preferred. If the amount of component (A) is less than 10 wt % or the amount of component (B) exceeds 65 wt %, the heat resistance and dimensional stability will decrease, which is undesirable. If the amount of component (A) exceeds 35 wt %, the heat resistance will increase, but the resistance to light discoloration will decrease. If the amount of component (B) is less than 36 wt %, it will be difficult to obtain a continuous phase of PA, and the oil resistance and molding properties characteristic of PA substances will not be manifested. If the amount of component (C) is less than 5 wt %, improvement in discoloration resistance will be inadequate, whereas if 29 wt % is exceeded, the heat resistance will decrease dramatically and the impact resistance will also decrease, which is undesirable.

Component (D) rubber polymer is a special component added in order to improve impact resistance, and the blend proportion thereof is 0–50 parts by weight with respect to 100 parts by weight of the total of components (A)–(C), with 5–30 parts by weight being preferred. If component (D) exceeds 50 parts by weight, the rigidity and heat resistance will decrease, which is undesirable.

The blend amount of component (E) pigment is 2–20 parts by weight with respect to 100 parts by weight of the total of components (A)–(D), with 5–15 parts by weight being preferred. If the amount of component (E) is less than 2 parts by weight, improvement of the resistance to discoloration by light will be essentially inadequate, whereas if 20 parts by weight is exceeded, the impact resistance will drop dramatically, which is undesirable.

In addition, the added amount of component (F) is preferably 0.01–10 parts by weight with respect to 100 parts by weight of the total amount of (A) and (B), with 0.05–5 parts by weight being additionally desirable and 0.1–2 parts by weight being particularly desirable. If the amount is less than 0.01 parts by weight, the compatibilizing effects will be inadequate, which is undesirable, and if 10 parts by weight is exceeded, the heat resistance will decrease, which is undesirable.

In the resin composition of the present invention, other polymers, ultraviolet light absorbers, antioxidants, plasticizers, flame retardants, antistatic agents and other additives, as well as glass fiber, carbon fiber, potassium titanate wiskers, mica, talc, clay and other fillers may be blended as desired in ranges wherein the physical properties of the present invention are not compromised.

The present invention is explained in additional detail below using application examples and comparative examples, but the present invention is not limited to these examples.

APPLICATION EXAMPLES

The following compounds were used in the application examples and comparative examples.

Component (A): Polyphenylene ether resin (PPE)
intrinsic viscosity [η] (chloroform, 25° C.) 0.48 dL/g
poly(2,6-dimethyl-1,4-phenylene)ether
Component (B): Polyamide resin (PA)
Nylon 6 (PA 6)
intrinsic viscosity 2.6 (average molecular weight 13,000)
terminal amino group concentration $8.1 \times 10^{-5}$ mol/g
terminal carboxy group concentration $6.0 \times 10^{-5}$ mol/g
melting point 220° C.
(Manufactured by Ube Gyosan K.K.)
Component (C): Styrene thermoplastic resin
Rubber-modified polystyrene resin (HIPS)
 rubber content 8.8%
 rubber average particle diameter
 (determined by laser MEK method) 2.2 μm
 polystyrene weight-average molecular weight 225,000
 (HT 644, Industry standard,
 manufactured by Mitsubishi Kasei Corp.)
Component (D): Rubber polymer
hydrogenated styrene/ethylene/propylene/styrene copolymer
(SEPS) (Septon 2006, Industry standard,
manufactured by Kuraray)
Component (E): Pigment
 pigment (a): titanium oxide (Tipaque R-680, manufactured by Ishibara Sangyo)
 pigment (b): titanium oxide yellow (42-120A, manufactured by Nippon Ferro)
 pigment (c): carbon black (#45B, manufactured by Mitsubishi Kasei Corp.)
Component (F): Compatibilizer
citric acid Application Examples 1–6. Comparative Examples 1–8

The components in the amounts indicated in Tables I and III (parts by weight) were used to form pellets by kneading and extruding at a rotation rate of 300 rpm and a barrel temperature setting of 290° C. using a 50-mm-diameter biaxial extruder equipped with a pressure reduction vent which had the capacity for both upstream and downstream supply of raw materials. The following four methods were used for the manufacture method.

Manufacture Method I: Components (A), (C), (D), (E) and (F) were supplied from the upstream section, and component (B) alone was supplied from the downstream section (side).

Manufacture Method II: Components (A)–(F) were supplied from the upstream side all at once.

Manufacture Method III: Components (A), (C), (D), (E), (F) and 10 parts by weight of the 55 parts by weight of component (B) were supplied from the upstream side, and the remaining 45 parts by weight were supplied from the downstream side.

Manufacture Method IV: Components (A), (C), (D) and (F) were supplied from the upstream side, and Components (B) and (E) were supplied from the downstream side.

Next, the pellets obtained from the above processes were molded using an extrusion molder set at a cylinder temperature of 270° C. and a mold temperature of 80° C., and test strips were manufactured and subjected to various characteristic tests.

The various characteristics shown in Tables II and IV were evaluated using the following test methods.

⅛ in notched Izod impact strength (NII)

As described in ASTM D256, the impact strength was determined at room temperature and at −30° C. In addition, the ductile/brittle transition point (D/B transition point) was determined using a thermostatic chamber.

Flexural characteristics (flexural strength FS and flexural modulus FM)

As described in ASTM D790, measurement was carried out using ¼-in thick test strips.

Heat deformation temperature (HDT)

As described in ASTM D648, the heat deformation temperature was measured under a load of 4.6 kg/cm² using ¼-in thick test strips.

Light resistance

50×50×3 mm injection molded plates were used as test strips. After exposing (direct irradiation for 25, 50, 100 and 200 h and a black panel temperature of 63° C.) these strips to a xenon fadometer (Atlas Ci35, industry standard, manufactured by Atlas) the color difference (ΔE) and the yellowing level (ΔYI) were measured using a spectrophotometer (CA-35, manufactured by Hitashi Ltd.).

Morphology

The cut ends of the injection moldings (NII torn side) were cut into thin strips using a cryomicrotome, and after a dyeing treatment (ruthenium oxide, osmium oxide treatment), the dispersion condition of the PPE and the phase containing the pigment were observed using a transmission electron microscope (TEM-1200MII, manufactured by Nippon Denshi). The indicators in Tables II and IV are used to represent the results of observation.

⊚: The particles of the disperse phase (PPE phase) are extremely fine (1 μm or less) and a stable dispersion was formed.

○: The particle diameter of the disperse phase (PPE phase) is extremely small (1–5 μm).

Δ: The particle diameter of the disperse phase (PPE phase) is large (5 μm or greater).

×: no distinction between continuous phase and disperse phase.

The results of these evaluations are shown in Tables II and IV.

TABLE I

| | Application Example | | | | | |
|---|---|---|---|---|---|---|
| | 1 | 2 | 3 | 4 | 5 | 6 |
| (A) PPE | 30 | 25 | 25 | 25 | 25 | 20 |
| (B) PA-6 | 40 | 45 | 55 | 55 | 55 | 60 |
| (C) HIPS | 20 | 20 | 10 | 10 | 10 | 10 |
| (D) SEPS | 10 | 10 | 10 | 10 | 10 | 10 |
| (F) Citric Acid | 1 | 1 | 1 | 1 | 1 | 1 |
| (E) Pigment (a) | 4 | 4 | 4 | 8 | 10 | 4 |
| (b) | — | — | — | — | — | — |
| (c) | 0.05 | 0.05 | 0.05 | 0.1 | 0.2 | 0.05 |
| Manufacture Method | I | I | I | I | I | I |

TABLE II

| | Application Example 1 | Application Example 2 | Application Example 3 | Application Example 4 | Application Example 5 | Application Example 6 |
|---|---|---|---|---|---|---|
| NII (kg · cm/cm) | | | | | | |
| Temperature | 52 | 51 | 65 | 61 | 60 | 62 |
| −30° C. | 11 | 10 | 18 | 17 | 15 | 20 |
| D/B Transition Point (°C.) | 5 ~ 10 | 5 ~ 10 | 0 ~ 5 | 0 ~ 5 | 0 ~ 5 | 0 ~ 5 |
| F.S (kg/cm$^2$) | 850 | 860 | 870 | 870 | 890 | 860 |
| F.M (× 10$^3$ kg/cm$^2$) | 21.5 | 22.0 | 22.3 | 22.6 | 24.0 | 21.0 |
| HDT (°C.) | 161 | 160 | 168 | 168 | 169 | 167 |
| Morphology | ○ | ○ | ◎ | ◎ | ◎ | ◎ |
| Phase Containing the Pigment | PPE | PPE | PPE | PPE | PPE | PPE |
| ΔE/ΔYI | | | | | | |
| 25 Hours | 3/7 | 3/6 | 3/6 | 2/5 | 2/4 | 2/5 |
| 50 Hours | 6/12 | 4/10 | 4/7 | 4/8 | 3/6 | 4/8 |
| 100 Hours | 8/17 | 7/14 | 7/14 | 5/11 | 3/8 | 5/12 |
| 200 Hours | 10/21 | 8/18 | 8/17 | 6/14 | 4/10 | 6/15 |

TABLE III

| | Comparative Example | | | | | | | |
|---|---|---|---|---|---|---|---|---|
| | 1 | 2 | 3 | 4 | 5 | 6 | 7 | 8 |
| (A) PPE | 50 | 50 | 30 | 30 | 20 | 25 | 25 | 25 |
| (B) PA-6 | 40 | 40 | 40 | 40 | 40 | 55 | 55 | 55 |
| (C) HIPS | — | — | 20 | 20 | 30 | 10 | 10 | 10 |
| (D) SEPS | 10 | 10 | 10 | 10 | 10 | 10 | 10 | 10 |
| (F) Citric Acid | 1 | 1 | 1 | 1 | 1 | 1 | 1 | 1 |
| (E) Pigmet | | | | | | | | |
| (a) | 4 | 8 | 1 | 20 | 4 | 8 | 8 | 8 |
| (b) | — | — | — | — | — | — | — | — |
| (c) | 0.05 | 0.1 | 0.01 | 0.25 | 0.05 | 0.1 | 0.1 | 0.1 |
| Manufacture Method | I | I | I | I | I | II | III | IV |

TABLE IV

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| NII (kg · cm/cm) | | | | | | | | |
| Temperature | 74 | 71 | 55 | 15 | 6 | 10 | 21 | 33 |
| −30° C. | 28 | 24 | 12 | 5 | 4 | 4 | 6 | 8 |
| D/B Transition point (°C.) | −5 ~ 10 | −5 ~ 10 | 5 ~ 10 | 30 ~ 35 | 40 or > | 40 or > | 35 ~ 40 | 25 ~ 30 |
| F.S (kg/cm$^2$) | 920 | 920 | 870 | 880 | 690 | 790 | 880 | 930 |
| F.M (× 10$^3$ kg/cm$^2$) | 23.4 | 23.5 | 22.5 | 23.0 | 19.0 | 22.1 | 23.0 | 24.8 |
| HDT (°C.) | 181 | 183 | 162 | 159 | 138 | 151 | 156 | 172 |
| Morphology | ◉ | ◉ | ○ | Δ | X | X | X | ◉ |
| Phase Containing the Pigment | PPE | PPE | PPE | PPE | PPE | PA | PA | PA |
| ΔE/ΔYI | | | | | | | | |
| 25 Hours | 8/16 | 6/12 | 5/10 | 1/3 | 3/7 | 3/6 | 3/5 | 3/5 |
| 50 Hours | 11/23 | 9/18 | 8/17 | 2/4 | 6/10 | 5/10 | 5/9 | 4/8 |
| 100 Hours | 16/32 | 12/25 | 11/24 | 3/7 | 7/15 | 7/14 | 6/13 | 5/11 |
| 200 Hours | 19/39 | 16/32 | 14/30 | 3/8 | 8/19 | 8/18 | 6/15 | 6/13 |

Application Examples 1, 2, 3 and 6 involved holding the blend amounts of components (D), (E) and (F) constant while varying the blend amounts of components (A), (B) and (C) within the range of the present invention. In addition, Application Examples 3, 4 and 5 involved varying the blend amount of component (E) alone within the range of the present invention. The aforementioned application examples were all carried out using Manufacture Method I. In each case, the coloration resistance was favorable, and in addition, the impact resistance and heat resistance characteristics were also favorable.

Manufacture Method I was used in Comparative Examples 1–5, but in these examples, the blend amounts of each component were varied.

Comparative Example 1, in contrast to Application Example 1, did not include component (C), and component (C) of Application Example 1 was replaced by component (A). The blend amount of component (E) was within the range of the present invention, but the blend amount of component (A) was high, and thus the coloration resistance was exceedingly poor.

Comparative Example 2 was a case where the blend amount of component (E) was twice that of Comparative Example 1. In contrast to Comparative Example 1, yellowing was dramatically improved; however, the yellowing was exceedingly poor in comparison to Application Example 1.

Comparative Example 3 involved using the same blend amounts as in Application Example 1 for components (A)–(D) and (F), but the blend amount of component (E) decreased. Adequate improvement in yellowing was not obtained.

Comparative Example 4 involved using the same blend amounts as in Application Example 1 for components (A)–(D) and (F), but the blend amount of component (E) was increased in contrast to Comparative Example 3. The decrease in impact resistance and heat resistance was dramatic.

Comparative Example 5 involved using an increased amount of component (C). Although the yellowing improved, the impact resistance and heat resistance and flexural characteristics decreased dramatically.

Comparative Examples 6–8 involved using the same blend amounts for each component as in Application Example 4, but the manufacture method was changed in order to evaluate the differences from Application Example 4.

Comparative Example 6 involved using Manufacture Method II. No distinction between the disperse phase and the continuous phase could be made, and in addition, component (E) was dispersed in the PA phase. The impact resistance and heat resistance were low.

Comparative Example 7 involved the use of Manufacture Method III. As with Comparative Example 6, no distinction could be made between the disperse phase and the continuous phase, and component (E) was dispersed in the PA phase. The impact resistance and heat resistance were low.

Comparative Example 8 involved the use of Manufacture Method IV. The disperse phase (PPE phase) particle diameter was extremely fine and the dispersion was stable, but because both components (E) and (B) were supplied from downstream, component (E) entered into the PA phase which produced low impact resistance.

In this manner, it may be seen from a comparison with Application Example 4 wherein Manufacture Method I was used and the morphology of the present invention was obtained, that Manufacture Methods II–IV are undesirable because they produce low impact resistance and heat resistance.

The resin composition of the present invention greatly improves the resistance to light coloration due to the PPE, while maintaining the superior properties characteristics of PPE/PA resin compositions (impact resistance, heat resistance, mechanical strength, etc.). For this reason, the present invention is appropriate for use in external parts for automobiles such as oil covers, bumpers and spoilers.

We claim:

1. A method for improving resistance to light coloration of a thermoplastic resin composition, comprising the steps of:
   (1) melt-kneading the following components:
     (a) a polyphenylene ether resin present from 10 to 35% by weight of components (a), (b) and (c);
     (c) a polystyrene resin or high impact polystyrene resin present from 5 to 29% by weight of components (a), (b) and (c);
     (d) a pigment present from 2–20 parts by weight with respect to 100 parts by weights of components (a), (b), (c) and (e); and
     (e) a rubber polymer present from 5 to 30 parts by weight per 100 parts of components (a), (b) and (c), selected from the group consisting of styrene/isoprene copolymers, styrene/butadiene block copolymers, partially hydrogenated styrene/ butadiene copolymers, partially hydrogenated styrene/isoprene copolymers, styrene/ethylene/propylene/styrene copolymers and mixtures thereof;

(2) adding component (b) a polyamide resin present from 36 to 65% by weight of components (a), (b) and (c).

2. The method of claim 1, wherein said pigment is an organic pigment, an inorganic pigment or a mixture thereof.

3. The method of claim 1, further comprising the step of adding a compatibilizer for components (a) and (b) wherein said compatibilizer is selected from a group consisting of:
   (a) citric acid, malic acid, agaricic acid and derivatives thereof, and
   (b) compounds having in a single molecule both:
      (i) a carbon—carbon double bond or a carbon—carbon triple bond, and
      (ii) carboxylic acid groups, amide groups, imide groups, ester groups, epoxy groups, amino groups, hydroxy groups, or oxazoline groups.

4. The method of claim 1, wherein said rubber polymer is elastic at room temperature.

5. The method of claim 1, wherein the pigment is carbon black.

6. The method of claim 1, wherein the rubber polymer is a partially hydrogenated styrene/butadiene copolymer, a partially hydrogenated styrene/isoprene copolymer, or a mixture of a partially hydrogenated styrene/butadiene copolymer and a partially hydrogenated styrene/isoprene copolymer.

7. A thermoplastic resin composition made by a method comprising the steps of:
   (1) melt-kneading in an upstream section:
      (a) a polyphenylene ether resin present from 10 to 35% by weight of components (a), (b) and (c);
      (c) a polystyrene resin or high impact polystyrene resin present from 5 to 29% by weight of components (a), (b) and (c);
      (d) a pigment present from 2–20 parts by weight with respect to 100 parts by weights of components (a), (b), (c) and (e);
      (e) a rubber polymer present from 5 to 30 parts by weight per 100 parts of components (a), (b) and (c), selected from the group consisting of styrene/isoprene copolymers, styrene/butadiene block copolymers, partially hydrogenated styrene/butadiene copolymers, partially hydrogenated styrene/isoprene copolymers, styrene/ ethylene/ propylene/ styrene copolymers and mixtures thereof;
      (f) a compatibilizer for components (a) and (b); and
   (2) adding component (b) a polyamide resin present from 36 to 65% by weight of components (a), (b) and (c) from a downstream section to the upstream section.

8. The composition of claim 7, wherein the pigment is carbon black.

9. The composition of claim 7, wherein polyphenylene ether resin is a dispersed phase of particles less than one micron in diameter.

10. The composition of claim 7, wherein the rubber polymer is a partially hydrogenated styrene/butadiene copolymer, a partially hydrogenated styrene/isoprene copolymer, or a mixture of a partially hydrogenated styrene/butadiene copolymer and a partially hydrogenated styrene/isoprene copolymer.

* * * * *